United States Patent
Quinn et al.

[11] Patent Number: 6,078,244
[45] Date of Patent: Jun. 20, 2000

[54] THERMAL SWITCH

[75] Inventors: William F. Quinn, Greenwich; Wayne M. Motley, Mansfield, both of Ohio; James B. Kalapodis, Fayetteville, N.C.

[73] Assignee: Therm-O-Disc, Incorporated, Mansfield, Ohio

[21] Appl. No.: 09/410,596

[22] Filed: Oct. 1, 1999

Related U.S. Application Data

[63] Continuation of application No. 09/197,031, Nov. 20, 1998.

[51] Int. Cl.[7] .......................... H01H 61/00; H01H 37/32; H01M 2/00
[52] U.S. Cl. .......................... 337/140; 337/14; 337/298; 337/333; 429/61
[58] Field of Search .................................. 337/139, 140, 337/141, 382, 393, 395, 380, 112, 298–372, 765; 429/61, 62, 57, 66, 58, 541, 71, 122, 174

[56] References Cited

U.S. PATENT DOCUMENTS

| | | |
|---|---|---|
| 2,497,397 | 2/1950 | Dales . |
| 2,743,335 | 4/1956 | Moyer . |
| 3,213,250 | 10/1965 | Marcoux . |
| 3,474,372 | 10/1969 | Davenport et al. . |
| 3,707,694 | 12/1972 | DuRocher . |
| 3,801,944 | 4/1974 | Brown . |
| 3,805,207 | 4/1974 | Grimshaw ................................ 337/89 |
| 3,872,415 | 3/1975 | Clarke .................................... 337/140 |
| 3,872,417 | 3/1975 | Hufschmid .............................. 337/365 |
| 4,035,552 | 7/1977 | Epstein . |
| 4,188,460 | 2/1980 | Kang et al. . |
| 4,356,478 | 10/1982 | Muggli et al. . |
| 4,374,311 | 2/1983 | Okahashi et al. . |
| 4,395,694 | 7/1983 | Wehl . |
| 4,503,131 | 3/1985 | Baudrand . |
| 4,774,151 | 9/1988 | Cuomo et al. . |
| 4,782,318 | 11/1988 | Boulanger . |
| 4,818,641 | 4/1989 | Ledenican . |
| 4,855,195 | 8/1989 | Georgopoulos et al. . |
| 4,975,341 | 12/1990 | Tucholski et al. . |
| 4,992,339 | 2/1991 | Georgopoulos . |
| 5,014,035 | 5/1991 | Hamada et al. ........................ 337/372 |

(List continued on next page.)

FOREIGN PATENT DOCUMENTS

| | | |
|---|---|---|
| 0 689 255 A2 | of 0000 | European Pat. Off. . |
| 0 689 255 A3 | of 0000 | European Pat. Off. . |
| 0 700 109 A1 | of 0000 | European Pat. Off. . |
| 0 757 394 A1 | of 0000 | European Pat. Off. . |
| 0 773 595 A1 | of 0000 | European Pat. Off. . |
| 0 8 236 102 | of 0000 | European Pat. Off. . |
| 04345724 | of 0000 | Japan . |
| 08185849 | of 0000 | Japan . |
| 08236102 | of 0000 | Japan . |
| 410154530 | of 0000 | Japan . |
| 410321103A | of 0000 | Japan . |
| 59-191273 | of 0000 | Japan . |
| 59-203376 | of 0000 | Japan . |
| 63-175345 | of 0000 | Japan . |
| 10-321103 | 12/1998 | Japan ............................. H01H 37/32 |

*Primary Examiner*—Leo P. Picard
*Assistant Examiner*—Anatoly Vortman
*Attorney, Agent, or Firm*—Harness, Dickey & Pierce, P.L.C.

[57] ABSTRACT

A thermal switch assembly has a stiffener disc positioned against a support flange that extends inwardly from a peripheral wall of a plastic assembly grommet. An actuator member of shape memory metal is received in a recess in the stiffener disc, and an insulator ring lies against the disc and actuator member on the opposite side of the disc from the support flange. A cap member is positioned against the insulator on the opposite side thereof from the stiffener disc, and a resilient actuator blade on the actuator member extends through a central opening in the insulator into engagement with the cap member. The actuator blade normally completes a circuit between the stiffener disc and the cap member, and automatically disengages from the cap member at an elevated transition temperature to open the circuit.

24 Claims, 5 Drawing Sheets

6,078,244
Page 2

U.S. PATENT DOCUMENTS

| | | |
|---|---|---|
| 5,026,615 | 6/1991 | Tucholski . |
| 5,040,567 | 8/1991 | Nestler et al. .......................... 137/625 |
| 5,061,914 | 10/1991 | Busch et al. . |
| 5,188,909 | 2/1993 | Pedicini . |
| 5,206,622 | 4/1993 | Lattari ...................... 337/89 |
| 5,268,664 | 12/1993 | Givler . |
| 5,337,036 | 8/1994 | Kuczynski ............................. 337/343 |
| 5,376,467 | 12/1994 | Abe et al. . |
| 5,567,539 | 10/1996 | Takahashi et al. ........................ 429/57 |
| 5,619,177 | 4/1997 | Johnson et al. . |
| 5,691,073 | 11/1997 | Vu et al. ..................................... 429/7 |
| 5,747,187 | 5/1998 | Byon ........................................ 429/58 |
| 5,750,277 | 5/1998 | Vu et al. ..................................... 429/7 |
| 5,766,790 | 6/1998 | Kameishi et al. . |
| 5,766,793 | 6/1998 | Kameishi et al. ........................ 429/62 |
| 5,825,275 | 10/1998 | Wuttig et al. . |
| 5,844,464 | 12/1998 | Kalapodis et al. ..................... 337/140 |
| 5,879,832 | 3/1999 | Vu et al. . |

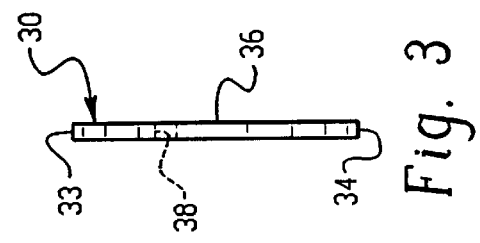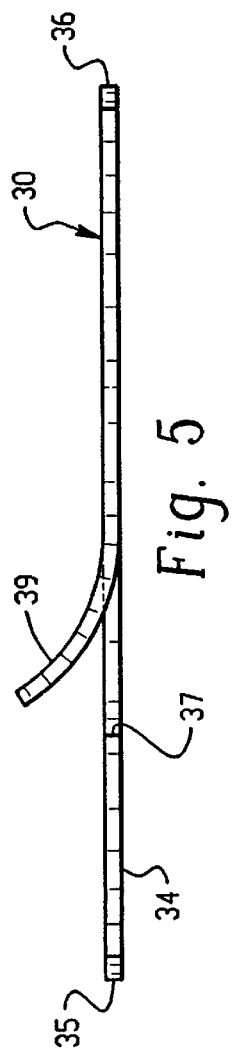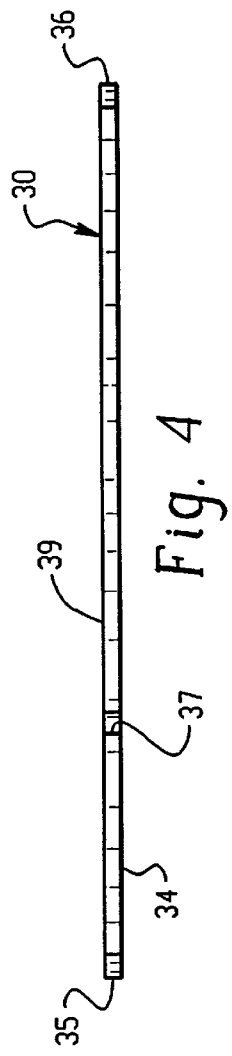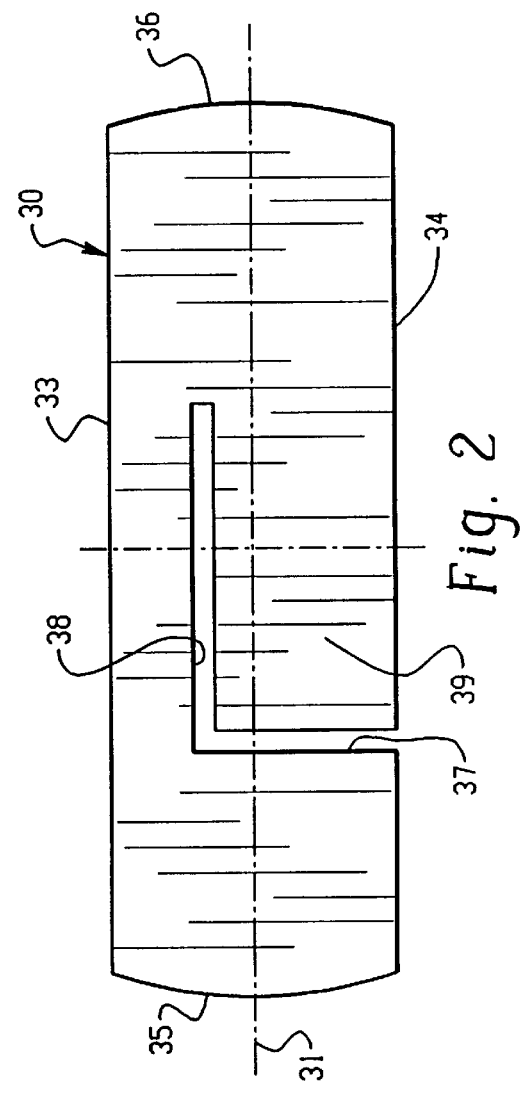

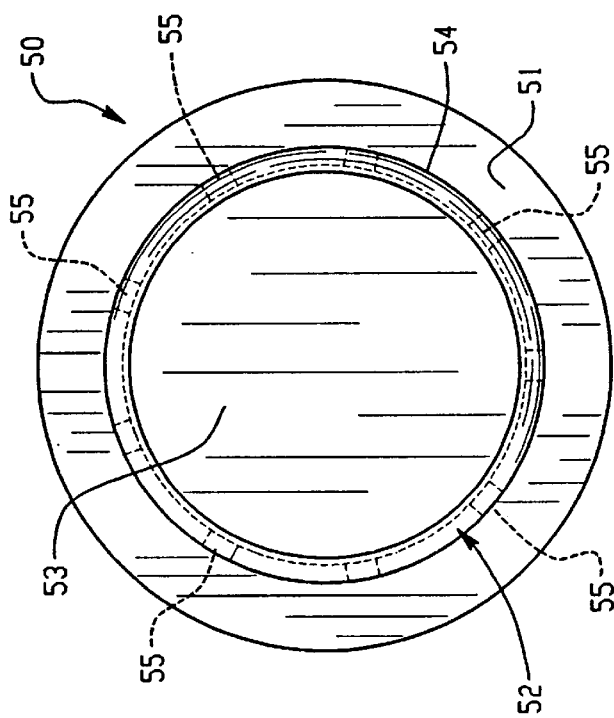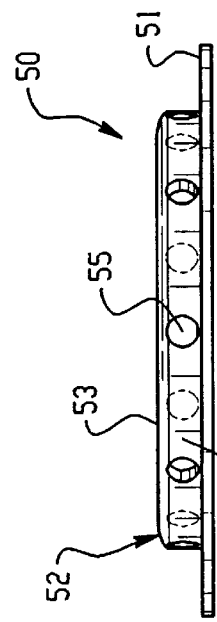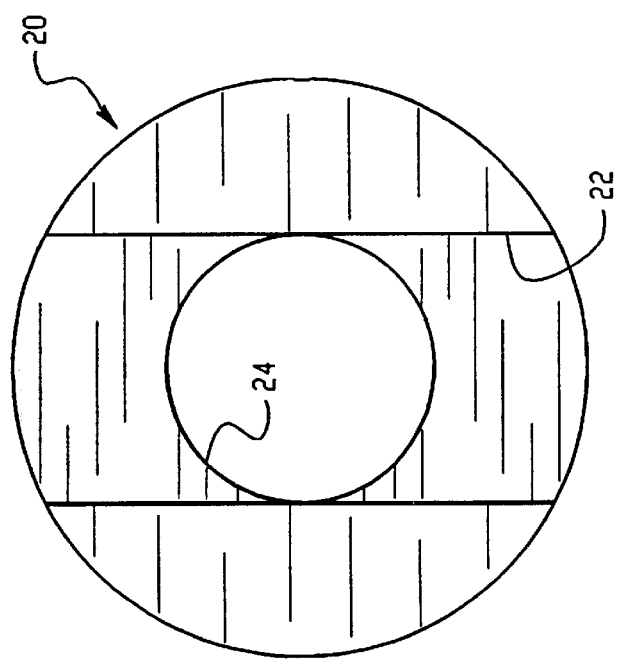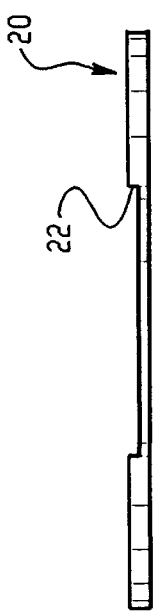

THERMAL SWITCH

This is a continuation of U.S. patent application Ser. No. 09/197,031, filed Nov. 20, 1998.

BACKGROUND OF THE INVENTION

This application relates to the art of thermal switches and, more particularly, to thermal switches that use current carrying actuators of shape memory metal. The invention is particularly applicable for use with rechargeable batteries to prevent thermal runaway and will be described with specific reference thereto. However, it will be appreciated that the invention has broader aspects and can be used for other purposes in applications where protection against excessive current and overheating are desired.

Rechargeable batteries have various physical sizes to fit within electrical devices that are powered by the batteries. Thermal switches that protect rechargeable batteries against excessive current and overheating must fit within the same physical battery envelope. The switch must be very small in order to avoid any significant increase in the physical size of the battery, and to avoid any significant reduction in the size or capacity of the electrochemical cell.

Because of the very small size of such switches and their components, it is difficult to crimp a switch assembly into a battery case without distorting the switch and its components. Such distortion may render the switch inoperative or undesirably change its operational characteristics so that it no longer will perform its intended function. It would be desirable to have a miniature switch assembly that can be crimped into a battery case without distorting the switch assembly or its operational components in a manner that renders the switch inoperative or changes its operating characteristics.

SUMMARY OF THE INVENTION

A thermal switch having a current carrying actuator of shape memory metal includes a plastic assembly grommet having a peripheral wall and a support flange extending inwardly from the peripheral wall. A stiffener disc is positioned on the support flange within the peripheral wall and a diametrical recess in the stiffener disc receives an actuator member of shape memory metal. An insulator ring is positioned on the stiffener disc and the actuator member, and a cap member is positioned on the insulator ring. A resilient blade on the actuator member extends upwardly into engagement with the cap member to complete an electrical circuit between the stiffener disc and the cap member. Heat is transferred to the actuator member by conduction, radiation and $I^2R$ heating. When the temperature of the actuator member reaches the austenite transition phase of the particular memory metal, the actuator blade deforms away from the cap member to open the electrical circuit.

The plastic assembly grommet holds all of the components together and maintains their relationship when a battery case is crimped over and around the plastic grommet which deforms to seal the switch assembly against exposure to the hostile battery environment.

In a preferred arrangement, the entire actuator member, including the opposite surfaces and the peripheral surface of the resilient actuator blade, are plated with a precious metal.

In one arrangement, the stiffener disc has a central opening therethrough and a rupturable foil member is positioned between the stiffener disc and the battery interior. Excessive pressure within the battery then ruptures the foil to relieve pressure through the central opening in the stiffener disc and through suitable holes provided in the cap member.

It is a principal object of the present invention to provide an improved thermal switch assembly that uses a current carrying actuator of shape memory metal.

It is another object of the invention to provide an improved thermal switch assembly that can be crimped into a battery case without distorting the switch assembly or otherwise interfering with its operating characteristics.

It is a further object of the invention to provide an improved current carrying actuator of shape memory metal.

It is also an object of the invention to provide an improved switch assembly that is sealed against a hostile battery environment by a plastic assembly grommet that also functions to hold the switch components together when the switch assembly is crimped into a battery case.

It is another object of the invention to provide an improved rechargeable battery assembly having an improved protective thermal switch with a current carrying actuator of shape memory metal.

BRIEF DESCRIPTION OF THE DRAWING

FIG. 2 is a top plan view of an actuator member of shape memory metal;

FIG. 3 is an end elevational view thereof;

FIG. 4 is a side elevational view thereof prior to bending of the resilient actuator blade;

FIG. 5 is a side elevational view thereof subsequent to upward bending of the resilient actuator blade;

FIG. 6 is a top plan view of a stiffener disc;

FIG. 7 is a side elevational view thereof;

FIG. 8 is a top plan view of a cap member;

FIG. 9 is a side elevational view thereof;

DESCRIPTION OF A PREFERRED EMBODIMENT

Figure 1:
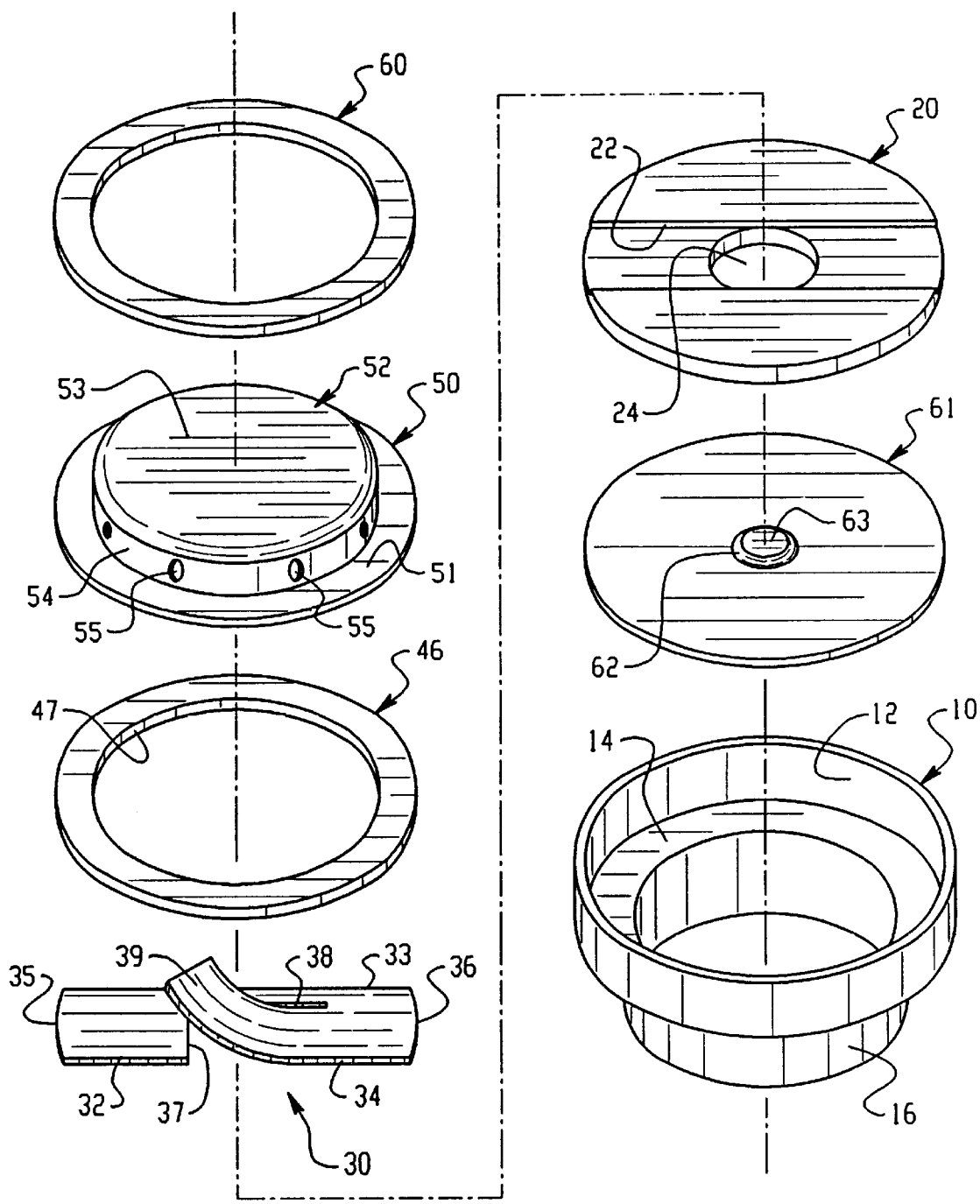
FIG. 1 is an exploded perspective illustration of a switch assembly in accordance with the present application.

Referring now to the drawing, wherein the showings are for purposes of illustrating a preferred embodiment of the invention only and not for purposes of limiting same, FIG. 1 shows an assembly grommet 10 of a suitable relatively soft and deformable plastic material such as polypropylene. Grommet 10 has a cylindrical peripheral wall 12 with a circular support flange 14 extending inwardly therefrom. Another cylindrical peripheral wall 16 having a smaller diameter than wall 12 depends from the inner periphery of support flange 14.

A flat metal stiffener plate or disc 20 is positionable against support flange 14 within peripheral wall 12 of assembly grommet 10. The diameter of stiffener disc 20 is such that it is closely received within peripheral wall 12. A diametrical recess 22 extends across stiffener disc 20, and a central circular opening is provided therethrough as indicated at 24.

An actuator member 30 of shape memory metal has a flat mounting base 32 with opposite flat faces, substantially parallel opposite sides 33, 34 and curved opposite ends 35, 36. Opposite ends 35, 36 are curved on a radius that is the same as the radius of the circle that defines the outer periphery of stiffener disc 20. In addition, the length of actuator member 30 is such that curved ends 35, 36 lie on the periphery of a common circle with the circular outer periphery of stiffener disc 20. Base 32 of actuator member 30 has a transverse slit 37 therein that extends substantially perpendicular to opposite sides 33, 34 and intersects a longitudinal slit 38 that extends substantially parallel to opposite sides 33, 34. These slits form a resilient actuator blade 39 that is bent upwardly out of the plane of flat base 32.

Recess 22 in stiffener disc 20 has a recess depth that is substantially the same as the thickness of base 32 of actuator member 30. When base 32 of actuator member 30 is received within recess 22, the upper outer surface of base 32 is substantially flush with the upper outer surface of stiffener disc 20.

An insulator ring 46 of a suitable insulating material such as a polyamide has a central circular opening 47 and is positionable against the upper surfaces of stiffener disc 20 and base 32 of actuator member 30. The outer periphery of insulator ring 46 has substantially the same diameter as the outer periphery of stiffener disc 20.

A dished metal cap member 50 has a flat circular peripheral portion 51 with an outer diameter that is substantially the same as the diameter of stiffener disc 20. Cap member 50 has a central domed portion 52 with a flat outer surface 53 and a peripheral wall 54 having a plurality of circumferentially-spaced holes 55 therethrough.

Peripheral portion 51 of cap member 50 is positionable against insulator ring 46 within peripheral wall 12 of assembly grommet 10. An aluminum retainer ring 60 is positionable within peripheral wall 12 of assembly grommet 10 on top of flat peripheral portion 51 of cap member 50.

Retainer ring 60 has a diameter slightly larger than the interior diameter of peripheral wall 12 on assembly grommet 10 so that retainer ring 60 must be forced into the cylindrical opening provided by peripheral wall 12. This provides radial forces between retainer ring 60 and peripheral wall 12 on assembly grommet 10 to prevent movement or displacement of retainer ring 60 which holds all of the components within peripheral wall 12 under light compression. Obviously, retainer ring 60 may be a split ring that can be reduced in diameter for insertion into peripheral wall 12 and then expand radially into engagement with the wall. Many other retainer arrangements also are possible.

When the switch assembly also is to provide protection against excessive pressure, an aluminum foil rupture disc 61 is positioned on grommet support flange 14, and stiffener disc 20 goes on top of the foil rupture disc.

Foil rupture disc 61 has a central protuberance 62 that extends into opening 24 in stiffener disc 20. Top portion 63 of protuberance 62 is depressed down within protuberance 62 and ruptures when subjected to excessive pressure within the battery. The pressure is relieved through vent holes 55 in cap member 50. When the switch assembly is to be used in battery applications without a foil rupture disc, central opening 24 in stiffener disc 20 is omitted.

Figure 12:
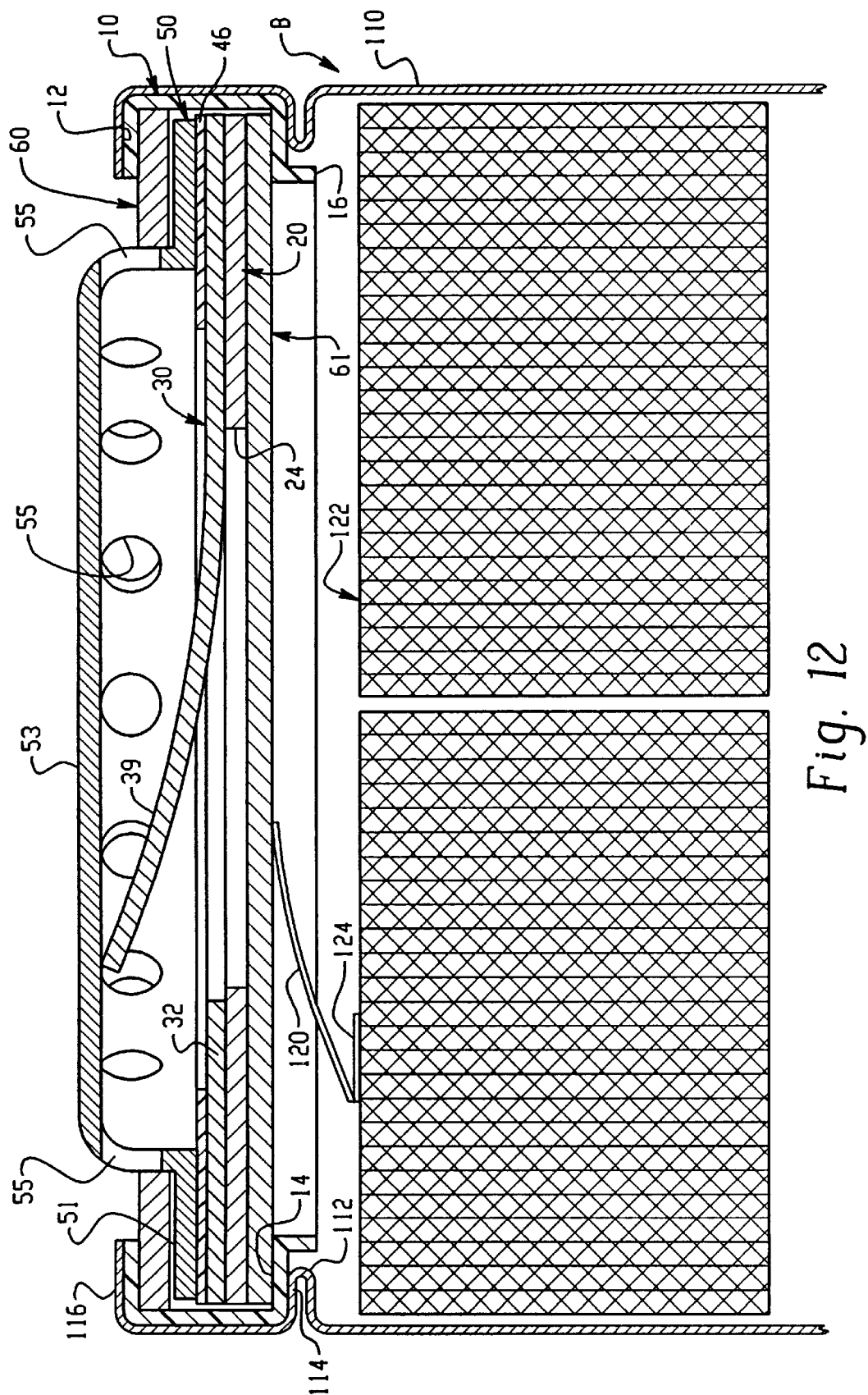
FIG. 12 is a cross-sectional elevational view showing the switch assembly of the present application crimped into the upper end of a battery case.

FIG. 12 shows a battery B having a battery case 110 with an upper portion that is circumferentially deformed inwardly as generally indicated at 112 to form a grommet support bead that provides a shoulder 114 on which support flange 14 of assembly grommet 10 is positionable. That portion 116 of the battery case extending upwardly from shoulder 114 then is crimped inwardly and downwardly while deforming grommet peripheral wall 12 into engagement with the outer surface of peripheral portion 51 on cap member 50. The periphery of the switch assembly is then sealed between grommet support flange 14 and the crimped portion 116 of the battery case.

This deformation of grommet peripheral wall 12 cooperates with support flange 14 to provide a generally U-shaped annular groove in which the peripheral portion of the other switch components are received and sealed.

The generally U-shaped groove and the peripheral portions of the components received therein are under axial compression by virtue of the crimped portion 116 of the battery case. A separate crimp ring also may be used to form a witch assembly independent of the battery case.

The switch assembly of the present application can be constructed as a normally open switch rather than as a normally closed switch by training the actuator blade to assume the curved shape shown in the drawings instead of moving back toward a flat position at the austenite transition temperature. The switch also is preferably a one-shot type that remains open once the austenite transition temperature is reached. However, it will be recognized that it can be constructed to reclose and to cycle between closed and open positions if so desired.

Stiffener disc 20 preferably is of copper although it will be recognized that other materials may be used such as nickel or silver plated cold rolled steel. Actuator 30 preferably is of nickel titanium shape memory metal and it will be recognized that other shape memory metals may be used. Actuator 30 preferably is plated with a precious metal such as silver or gold, although it will be appreciated that it may be possible to coat the actuator with a precious metal in other ways such as by sputtering or vapor deposition. It is important that the precious metal coating be on the peripheral surfaces as well as the faces so that current is conducted from the precious metal on one face to the precious metal on the opposite face through the peripheral precious metal as well as through the shape memory metal.

Examples of some dimensions will be given simply by way of illustration and not by way of limitation, and it will be recognized that the example dimensions may vary by several thousandths of an inch. With reference to FIGS. 6 and 7, generally rectangular diametrical recess 22 has a depth of about 0.008 inch while the maximum thickness of actuator member is about 0.010 inch. This makes the outer surfaces of the stiffener disc and the actuator member substantially flush with one another.

Recess 22 in stiffener disc 20 has a width of about 0.290 inch while the width of actuator member 30 is about 0.200 inch. Thus, the recess is actually about 45% wider than the actuator member in this example and preferably is at least 20% wider. This facilitates assembly of the components because the actuator member may be dropped into the stiffener disc within the grommet and it will easily fall into the recess. The actuator member is self-centering because its curved ends correspond to the curvature of the inner periphery of grommet peripheral wall 12.

With reference to FIGS. 2–5, slits 37 and 38 each has a width of about 0.02 inch. Longitudinal slit 38 is located between longitudinal centerline 31 and side 33, and has a length of about 0.25 inch. Slit 38 is closer to centerline 31 than to side 33. Transverse slit 37 has a length of about 0.14 inch, and is located approximately midway between transverse centerline 32 and end 35. The overall length of actuator 30 between ends 35 and 36 along longitudinal centerline 31 is about 0.627 inch.

When the switch is assembled, the end of resilient actuator blade 39 makes essentially line contact with the interior surface of cap member 50 with a contact force of at least 150 grams. The resistance of the switch assembly between the stiffener disc and the cap, or between the rupture disc and the cap, is not greater than 50 milliohms and preferably much lower.

Figure 10:
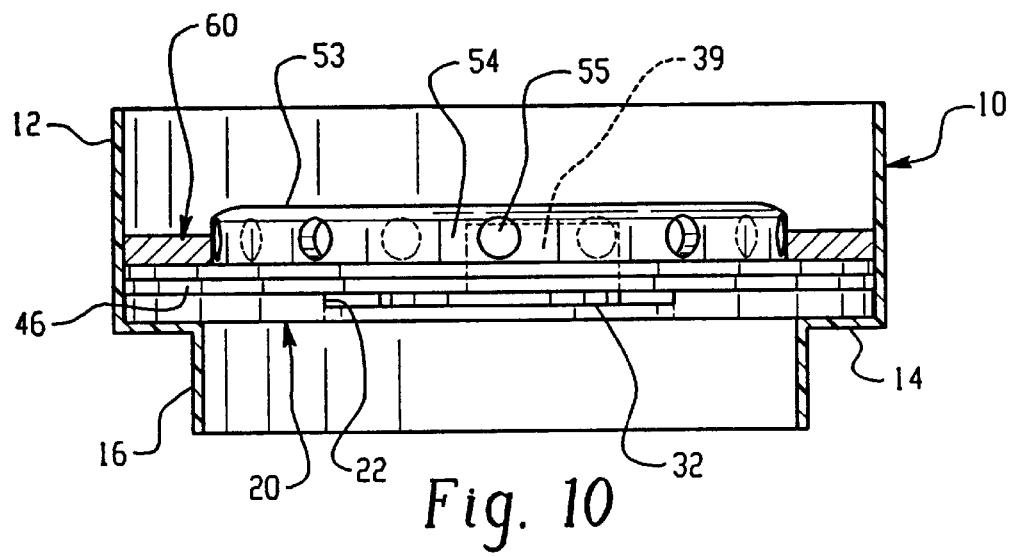
FIG. 10 is a side elevational view of the switch components assembled into a plastic grommet and with the plastic grommet cut-away for clarity of illustration.
Figure 11:
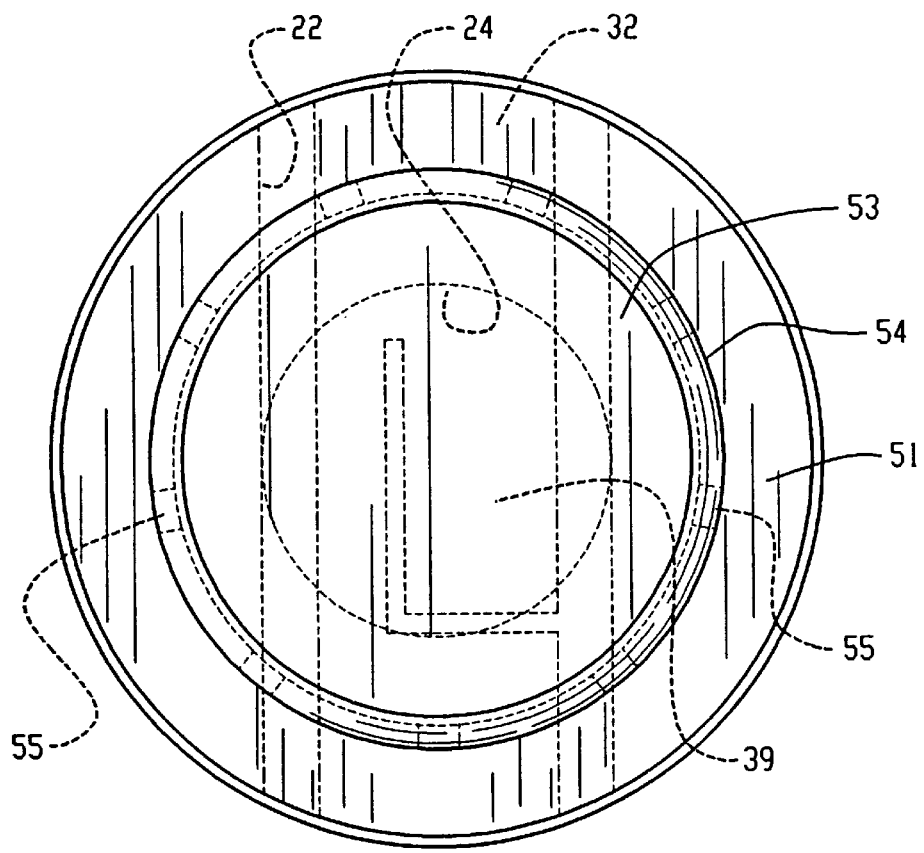
FIG. 11 is a top plan view of FIG. 10 with portions shown in dotted lines interiorly of the switch for clarity of illustration.

Depending on the size and the switch assembly, it may have a continuous current rating up to about 3 amps or up to about 20 amps. The resistance of less than 50 milliohms is in the relatively loose assembly of the components into the plastic assembly grommet as shown in FIG. 10. The peripheral portions of the components are under relatively light compression that is provided by retainer ring 60 compressing the other components against support flange 14. When the components are under high compression by being peripherally and axially crimped within a battery case as shown in FIG. 12 or within a separate crimp ring, the resistance is less than 20.

Recess 22 in stiffener disc 20 has a width of about 0.290 inch while the width of actuator member 30 is about 0.200 inch. Thus, the recess is actually about 45% wider than the actuator member in this example and preferably is at least 20% wider. This facilitates assembly of the components because the actuator member may be dropped into the stiffener disc within the grommet and it will easily fall into the recess. The actuator member is self-centering because its curved ends correspond to the curvature of the inner periphery of grommet peripheral wall 12.

With reference to FIGS. 2–5, slits 37 and 38 each has a width of about 0.02 inch. Longitudinal slit 38 is located between longitudinal centerline 31 and side 33, and has a length of about 0.25 inch. Slit 38 is closer to centerline 31 than to side 33. Transverse slit 37 has a length of about 0.14 inch, and is located approximately midway between transverse centerline 32 and end 35. The overall length of actuator 30 between ends 35 and 36 along longitudinal centerline 31 is about 0.627 inch.

When the switch is assembled, the end of resilient actuator blade 39 makes essentially line contact with the interior surface of cap member 50 with a contact force of at least 150 grams. The resistance of the switch assembly between the stiffener disc and the cap, or between the rupture disc and the cap, is not greater than 50 milliohms and preferably much lower. Depending on the size and the switch assembly, it may have a continuous current rating up to about 3 amps or up to about 20 amps. The resistance of less than 50 milliohms is in the relatively loose assembly of the components into the plastic assembly grommet as shown in FIG. 10. The peripheral portions of the components are under relatively light compression that is provided by retainer ring 60 compressing the other components against support flange 14. When the components are under high compression by being peripherally and axially crimped within a battery case as shown in FIG. 12 or within a separate crimp ring, the resistance is less than 20 milliohms and more preferably less than 10 milliohms. The resistance can be made even lower by plating all surfaces of other components with a precious metal, such as rupture disc 61 when it is present, stiffener disc 20 and cap member 50.

Actuator 30 is stamped to the configuration shown in FIGS. 2–4 and is then plated with a precious metal. The actuator then is heated to its austenitic transformation temperature followed by cooling to its martensitic temperature. Blade 39 then is bent to the general configuration of FIG. 5. When the actuator is subsequently heated to its austenite transformation temperature, blade 39 automatically moves back toward the position of FIGS. 2–4 and this is its recovered position. Blade 39 could be bent upwardly before heating to the austenite transformation temperature and then bent down flat after cooling. The switch would then be a normally open switch. Blade 39 preferably is under less than 8% bending strain and most preferably less than about 4% bending strain as defined in U.S. patent application Ser. No. 08/850,082 filed May 2, 1997, the disclosure of which is hereby incorporated herein by reference. This makes the switch a one-shot type that remains open once the austenite transformation temperature is reached and does not return to a closed position upon cooling. By exceeding the stated percent strain and by proper training of the shape memory metal, it can be made to function as a switch that will cycle between closed and open positions as it is cooled and heated.

With reference to FIG. 12, the crimping of the battery case frequently is referred to as a collet redraw. It will be recognized that the switch can be assembled in other arrangements than into a plastic grommet and can be welded into a battery case rather than being crimped therein.

A length of nickel foil 120 is welded at one end to the underside of stiffener disk 20 or to the rupture disc if it is present. The wrapped multi-layer assembly 122 that forms the battery electrodes has a length of nickel foil 124 attached thereto. The lengths of nickel foils 120 and 124 is sufficient to permit welding of same together with the switch assembly held well above the open top of a battery case. After welding, the switch assembly is dropped into the open top of the battery case onto shoulder 114 of the grommet support bead 112 followed by crimping of battery case portion 116.

The thickness of actuator member 30 preferably is less than 0.020 inch, more preferably less than 0.015 inch and most preferably not greater than about 0.010 inch. These dimensions may be increased by several thousandths of an inch by the precious metal plating thickness of about 0.001–0.002 inch. Thicker shape memory material does not react as well or move as quickly at the transformation temperature. Thicker material also is less stable because it tends to plastically deform when the blade is bent to its desired radius.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

What is claimed is:

1. A thermal switch assembly including a stiffener plate having a plate upper surface, a recess in said plate upper surface, said recess having a recess depth, a current carrying actuator member of shape memory metal having a substantially flat base with a base thickness, said base being received in said recess, an annular electrical insulator positioned against said plate and an upper surface of said base, a cap member positioned against said insulator, and said actuator member having an actuator blade extending past said insulator into engagement with said cap member.

2. The switch assembly of claim 1 wherein said recess has a recess width and said actuator blade has a blade width, and said recess width is greater than said blade width.

3. The switch assembly of claim 2 wherein said recess width is at least 20% greater than said blade width.

4. The switch assembly of claim 1 wherein said actuator blade has upper and lower blade surfaces and a blade periphery, and said upper and lower blade surfaces and said blade periphery being coated with a precious metal.

5. The switch assembly of claim 1 including a plastic assembly grommet having a peripheral wall and a support flange extending inwardly from said peripheral wall, and said stiffener plate being positioned against said support flange within said peripheral wall.

6. The switch assembly of claim 5 wherein said actuator member cooperates with said peripheral wall to position said actuator member within said grommet.

7. The switch assembly of claim 1 wherein said stiffener plate is a circular disc having a disc periphery and said actuator member has opposite actuator member curved ends, and said disc periphery and said curved ends lie on the periphery of a common circle.

8. The switch assembly of claim 1 including a plastic assembly grommet having a peripheral wall and a support flange extending inwardly from said peripheral wall, said stiffener plate being positioned against said support flange within said peripheral wall, and a retainer ring positioned against said cap member on the opposite side thereof from said insulator, said retainer ring being in radial engagement with said peripheral wall.

9. The switch assembly of claim 1 wherein said stiffener plate has a central opening therethrough, and a rupturable foil member positioned against said stiffener plate on the opposite side thereof from said actuator member to normally close said central opening in said stiffener member.

10. The switch assembly of claim 1 wherein said actuator blade is defined by at least one slit in said actuator member.

11. The switch assembly of claim 10 wherein said base includes opposite sides, opposite ends and opposite faces, said actuator blade being formed intermediate said opposite ends.

12. The switch assembly of claim 11 wherein said actuator blade is defined by a first slit formed in said base and extending inwardly from one of said opposite sides and opposite ends.

13. A thermal switch assembly comprising a plastic assembly grommet having a peripheral wall and a support flange extending inwardly from said peripheral wall, an actuator member of shape memory metal supported on said support flange, said peripheral wall cooperates with end portions of said actuator member to position said actuator member, an insulator ring positioned against a surface of said actuator member opposite said support flange, and a cap member having a cap member peripheral portion positioned against said insulator ring, said actuator member having a resilient actuator blade extending away from said support flange into engagement with said cap member.

14. The switch assembly of claim 13 including a retainer ring positioned against said cap member peripheral portion within said peripheral wall of said assembly grommet, said retainer ring being in radial engagement with said peripheral wall of said assembly grommet.

15. The switch assembly of claim 13 further comprising a stiffener disc, wherein said stiffener disc has a diametrical recess therein having a recess depth and said actuator member has an actuator member thickness, said recess depth being substantially the same as said actuator member thickness, and said actuator member being received in said recess.

16. The switch assembly of claim 15 wherein said recess has a recess width and said actuator member has an actuator member width, and said recess width being at least 20% greater than said actuator member width.

17. The switch assembly of claim 13 further comprising a stiffener disc wherein said stiffener disc has at least one disc opening therein and further including a rupturable foil member positioned between said stiffener disc and said support flange to normally close said disc opening.

18. A thermal switch assembly comprising a plastic assembly grommet having a peripheral wall and a support flange extending inwardly therefrom, an actuator member of shape memory alloy, an insulator member supported on said actuator member and a cap member supported on said insulator member, said actuator member including an actuating blade extending through said insulator into engagement with said cap member and said peripheral wall is in mechanical communication with an actuator member end, and being operative to retain said actuator member, said insulator member and said cap member in assembled relationship.

19. An actuator member of shape memory metal comprising an elongated base having opposite sides, opposite ends and opposite faces, said base having a slit therein located intermediate said ends and extending inwardly from one of said sides to define a free end of a movable actuator blade, and said movable actuator blade being deformable to move said free end in a direction transversely of said faces.

20. The actuator member of claim 19 wherein said movable actuator blade has opposite actuator blade faces, and said opposite actuator blade faces and said movable actuator blade periphery being coated with a precious metal.

21. The actuator member of claim 19 wherein said base is substantially flat and said movable actuator blade normally extends out of the plane of said base and deforms back toward the plane of said base responsive to an elevated temperature.

22. The actuator member of claim 19 wherein said base has a central longitudinal axis extending in a direction between said opposite ends and said longitudinal slit is located between said axis and one of said opposite sides.

23. The actuator member of claim 19 wherein each of said opposite ends is curved to lie on the circumference of a common circle.

24. The actuator member of claim 19 wherein said base has a base center located at the midpoint between said opposite ends and said opposite sides, and said ends being curved on a radius that is centered on said base center and has a radius length that is equal to one-half the length of said base.

* * * * *

UNITED STATES PATENT AND TRADEMARK OFFICE
CERTIFICATE OF CORRECTION

PATENT NO. : 6,078,244
DATED : June 20, 2000
INVENTOR(S) : William F. Quinn et al.

It is certified that error appears in the above-identified patent and that said Letters Patent is hereby corrected as shown below:

Column 2,
Line 28, "," should be -- ; --.

Column 4,
Line 16, "witch" should be -- switch --.
Line 48, after "member " insert -- 30 --.

Column 5,
Delete lines 3 through 41 in its entirety as these are duplicates.

Signed and Sealed this

Twelfth Day of March, 2002

Attest:

JAMES E. ROGAN
Attesting Officer  Director of the United States Patent and Trademark Office